United States Patent Office 3,431,317
Patented Mar. 4, 1969

3,431,317
POLYMERIZATION OF PROPYLENE
Emanuel M. Amir, Baytown, Tex., assignor to
Esso Research and Engineering Company
No Drawing. Filed Oct. 23, 1965, Ser. No. 504,094
U.S. Cl. 260—683.15          4 Claims
Int. Cl. C07c 3/10

ABSTRACT OF THE DISCLOSURE

Propylene is polymerized to its dimer and the lower molecular weight oligomers by using an alkyl aluminum dichloride catalyst alone at temperatures within the range of 30° to 100° C. and at pressures of 30 p.s.i. to the saturation pressure of propylene. About 50 percent of the dimer produced are 4-methyl-2-pentene and about 25 percent normal hexenes.

---

The present invention is directed to a method for polymerizing propylene to its dimer and lower molecular weight oligomers. More specifically, it is directed to the polymerization of propylene with alkyl aluminum dihalides to form a product which has a distribution not observed with other known homogeneous catalyst systems.

The present invention may be briefly described as a method for polymerizing propylene to its dimer and the lower molecular weight oligomers of propylene by using an alkyl aluminum dichloride compound at temperatures within the range of 30° to 100° C. and at pressures of 30 p.s.i. to the saturation pressure of propylene.

Heretofore, it has been asserted that aluminum alkyl compounds alone are ineffective to polymerize propylene. In fact, the aluminum alkyl compounds heretofore have been used either with a Friedel-Crafts catalyst or a Ziegler-type catalyst to produce a catalyst system for polymerizing propylene. According to the present invention, however, the alkyl aluminum dichloride compound under temperature conditions of 30° to 100° C. and pressures of 30 p.s.i. to the saturation pressure of propylene are effective to polymerize propylene to the dimer and lower molecular weight oligomers.

One of the unique features in using an alkyl aluminum dichloride catalyst alone in the polymerization of propylene is the product distribution obtained. About 50% of the dimer produced is 4-methyl-2-pentene and about 25% normal hexenes. This product has not been observed with other known homogeneous catalyst systems. In the polymerization of propylene with an aluminum alkyl plus Friedel-Crafts catalyst system, 2-methyl-2-pentene is one of the major products. In a catalyst system of an aluminum alkyl and Ziegler-type catalyst, 2-methyl-1-pentene is a predominate product.

The polymerization of the present invention uses an alkyl aluminum dichloride as the catalyst. The alkyl may be selected from a $C_1$ to $C_{16}$ alkyl. Preferred catalysts are ethyl aluminum dichloride and isobutyl aluminum dichloride. The reaction is carried out in an inert liquid solvent which is selected from the paraffins or cycloparaffins material. Suitable inert solvents are n-heptane, n-pentane, cyclohexane, and the like. The catalyst may be introduced into a reactor in the inert solvent to which the propylene gas is added. The amount of catalyst is between 0.1 and 10% by weight based on the solvent. Preferably about 1% by weight of catalyst is added. The temperature of the reaction upon addition of the propylene is maintained between 30° to about 100° C. while the reactants are stirred. Preferably, the temperature is maintained between 50° and 80° C. Propylene gas is introduced so as to maintain the pressure of at least 30 p.s.i., but it is preferred to introduce the propylene until the saturation pressure of propylene is reached. The reaction is allowed to continue until the desired conversion has been attained, at which time the reaction is stopped by stopping the addition of propylene gas and adding water to decompose the catalyst. The products are recovered and dried. The pressure during the reaction is preferably maintained by the addition of propylene but other means may be used such as the use of an inert gas.

The present invention will be further described by the following examples which illustrate the present invention but are not to be considered so as to limit the invention.

EXAMPLE 1

A pressure reactor of 250 ml. capacity was dried and purged with dry nitrogen. A solution of 1 ml. (9.7 mmole) ethyl aluminum dichloride in 60 ml. dry n-heptane was transferred under nitrogen to the reactor, the cover closed and propylene gas introduced to its saturated vapor pressure (120–140 p.s.i.g.). The reactor was stirred and the reaction allowed to proceed where the temperature slowly rose to 57° C., then fell back to 30° C. over a total period of 7 hours.

The reaction mixture was removed from the reactor which was completely filled with liquid, the catalyst was decomposed with water, the solvent n-heptane removed, and 145 g. of product recovered. The composition of the product is given below in Tables I and II.

EXAMPLE 2

A solution of 1 ml. (10 mmole) isobutyl aluminum dichloride in 60 ml. of normal heptane were added to a reactor similarly as in Example 1. The temperature rose slowly to 58° C. and the reaction was allowed to proceed for 6 hours. After removal of the reaction mixture and decomposition of the catalyst, 138 g. of product was obtained. The composition of the product is given in Tables I and II below.

TABLE I

| Isomeric | Composition of products from— | |
|---|---|---|
|  | Example 1 (percent) | Example 2 (percent) |
| Hexenes | 71 | 71 |
| Nonenes and dodecenes | 15 | 17 |
| Pentadecenes and higher m. wt | 14 | 12 |

TABLE II

| | Composition of the hexene faction from— | |
|---|---|---|
|  | Example 1 (percent) | Example 2 (percent) |
| 4-methyl-1-pentene | 2.46 | 1.79 |
| 4-methyl-cis-2-pentene | 7.35 | 2.09 |
| 4-methyl-trans-2-pentene | 44.15 | 41.72 |
| 1-hexene | 0.45 | 0.35 |
| Cis-2-hexene | 5.32 | 5.26 |
| Trans-2-hexene | 17.15 | 18.27 |
| Cis-3-hexene | 0.76 | 0.91 |
| Trans-3-hexene | 4.58 | 5.46 |
| 2-methyl-1-pentene | 1.03 | 0.71 |
| 2-methyl-2-pentene | 15.85 | 17.28 |
| 3-methyl-trans-2-pentene | 0.11 | 0.06 |
| 2,3-dimethyl-2-butene | 0.77 | 1.10 |

The nature and object of the present invention having been completely described and illustrated and the best mode thereof contemplated set forth, what I wish to claim as new and useful and secure by Letters Patent is:

1. A method for polymerizing propylene to hexenes and lower molecular weight oligomers which comprises:

reacting propylene in an inert liquid solvent selected from the group consisting of paraffins and cycloparaffins at a temperature within the range of 30°–100° C. and at pressures between 30 p.s.i.g. and the saturation pressure of propylene with a catalyst which consists of an alkyl aluminum dichloride.

2. A method according to claim 1 wherein said alkyl aluminum dichloride is isobutyl aluminum dichloride.

3 A method according to claim 1 wherein said alkyl aluminum dichloride is ethyl aluminum dichloride.

4. A method according to claim 3 wherein said temperature is within the range of 50° to 80° C.

References Cited

UNITED STATES PATENTS

| | | | |
|---|---|---|---|
| 2,220,930 | 11/1940 | Kraus | 260—683.15 X |
| 2,967,206 | 1/1961 | Stuart et al. | 260—683.15 |
| 2,969,408 | 1/1961 | Nowlin et al. | 260—683.15 |
| 3,096,385 | 7/1963 | McConnell et al. | 260—683.15 |

FOREIGN PATENTS

| | | |
|---|---|---|
| 640,535 | 5/1964 | Belgium. |
| 655,458 | 1/1963 | Canada. |

PAUL M. COUGHLAN, JR., *Primary Examiner.*